(No Model.)
J. L. McGARRELL.
VINE HOLDER.
No. 483,858. Patented Oct. 4, 1892.
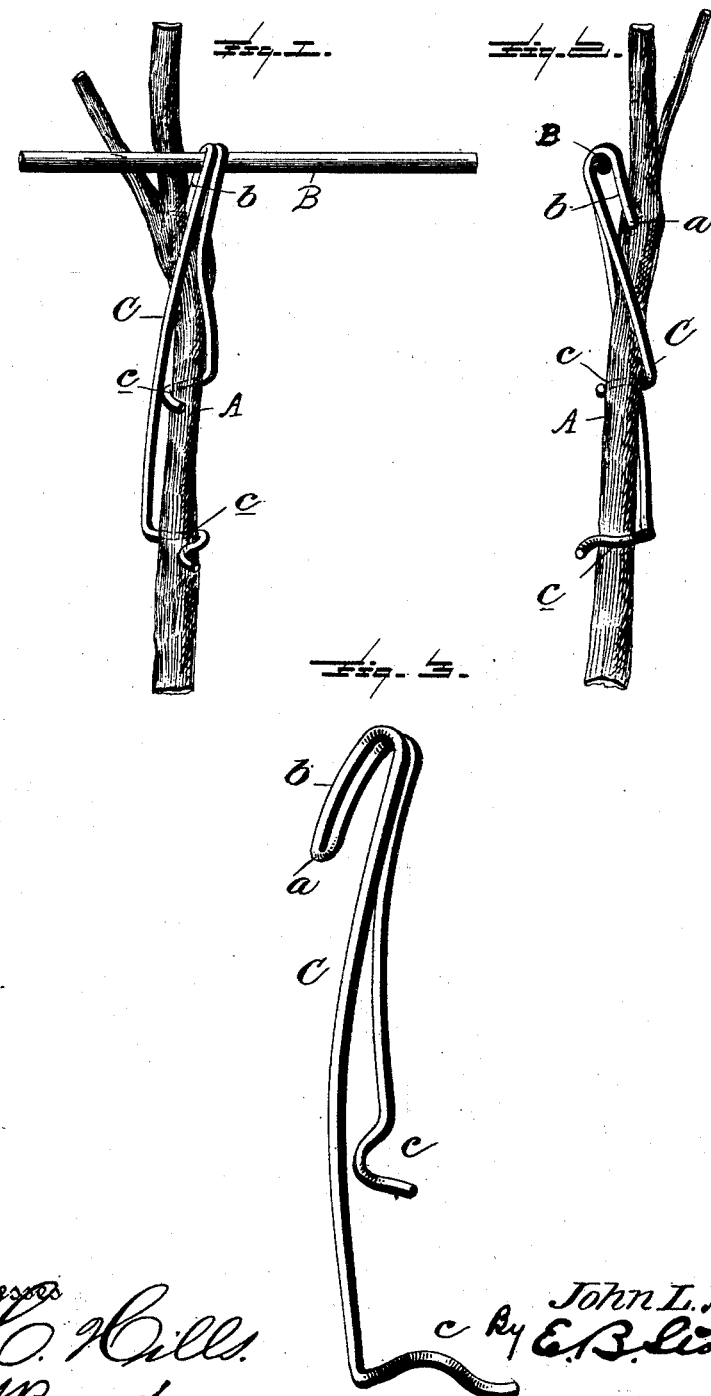
Witnesses
L. C. Hills.
E. H. Bond.
Inventor
John L. McGarrell,
By E. B. Stocking
Attorney

UNITED STATES PATENT OFFICE.

JOHN L. McGARRELL, OF WESTFIELD, NEW YORK.

VINE-HOLDER.

SPECIFICATION forming part of Letters Patent No. 483,858, dated October 4, 1892.

Application filed August 25, 1891. Serial No. 403,723. (No model.)

*To all whom it may concern:*

Be it known that I, JOHN L. McGARRELL, (minor,) a citizen of the United States, residing at Westfield, in the county of Chautauqua, State of New York, have invented certain new and useful Improvements in Vine-Holders, of which the following is a specification, reference being had therein to the accompanying drawings.

This invention relates to certain new and useful improvements in devices for holding vines, and it has for its objects, among others, to provide a simple, cheap, and efficient holder for grape-vines and the like by which the vines can be easily and quickly held up to the trellis or other support and which will securely hold them against falling by the winds or storms, and yet have a sufficient elasticity to permit sufficient movement of the vines to prevent breaking them by the wind.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a front elevation showing a vine held by my improved holder. Fig. 2 is a view at right angles to Fig. 1. Fig. 3 is an enlarged perspective view of the holder itself.

Like letters of reference indicate like parts throughout the several views.

Referring now to the details of the drawings by letter, A designates a portion of a vine, and B a wire or other support upon which it is designed to trail or support the same.

C designates the holder, which in this instance is made of wire of a single piece bent upon itself to form the rounded bend $a$ to avoid sharp angles or points which would be apt to injure the plant or vine, and the parallel portions of the wire are then bent to form the hook $b$, which should be made of a form to conform substantially to the support upon which it is desired to hold the vine. The parallel portions of the wire are then extended substantially parallel and in close proximity to each other for a short distance, and then they diverge slightly, as seen best in Fig. 3, the two ends or arms of the wire being of different lengths, so as to provide two supports at different points on the vine, as seen in the various figures of the drawings. The end of each arm is formed into a curved holding-bend or partial loop $c$, as shown, the two bends or partial loops being substantially at right angles to each other, so as to provide a hold upon the vine at points at different heights and upon different sides thereof, as shown. The loop of the longer arm may be formed upon a compound curve, as shown, so as to have a bearing upon the vine at more than one point on the periphery thereof, as seen in Fig. 1, and the end may form a convenient means of manipulating the loop when desired.

The hook $b$ and the arms are arranged at an incline from the perpendicular through the holder, as seen best in Fig. 2, and when applied to the vine the arms extend upon opposite sides thereof, as clearly seen in said Fig. 2.

The hook $b$ can be adjusted on the wire or support to bring the arms at different inclinations if desired. The holder is easily and quickly applied or removed, and in practice has proved most efficient in holding the vines against displacement or falling by the winds and storm. The holders may be made of varying sizes and of wire of different sizes. They may be formed of any preferred style of wire.

What I claim as new is—

1. A vine-holder formed of a single piece bent upon itself and having a hook for holding it upon a support and arms of different lengths formed with vine-engaging bends, said hook and arms extending in substantially-parallel planes, as set forth.

2. A vine-holder formed of a single piece of wire having a retaining-hook and arms of different lengths formed at their free ends with vine-engaging bends at substantially-right angles to each other, as set forth.

3. The vine-holder described, formed of a single piece of wire having the hook $b$ with rounded bend, the arms of different lengths extending from the said hook, the free ends of the said arms being provided with curved bends at an angle to each other, as and for the purpose specified.

In testimony whereof I affix my signature in presence of two witnesses.

JOHN L. McGARRELL.

Witnesses:
BYRON FENNER,
GEDDES L. HOUGH.